(12) United States Patent
Sato et al.

(10) Patent No.: US 11,837,094 B2
(45) Date of Patent: Dec. 5, 2023

(54) INFORMATION PROCESSING APPARATUS, INFORMATION PROCESSING SYSTEM, NON-TRANSITORY COMPUTER READABLE MEDIUM, AND INFORMATION PROCESSING METHOD

(71) Applicant: TOYOTA JIDOSHA KABUSHIKI KAISHA, Toyota (JP)

(72) Inventors: Aya Sato, Miyoshi (JP); Kuniaki Jinnai, Nagoya (JP); Taiki Yamashita, Toyota (JP); Eduard Vandersmitte, McKinney, TX (US); Gunnar Heinisch, McKinney, TX (US); Jake Morrow, Carrolton, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 17/397,402

(22) Filed: Aug. 9, 2021

(65) Prior Publication Data
US 2022/0051564 A1    Feb. 17, 2022

(30) Foreign Application Priority Data
Aug. 11, 2020  (JP) .................................. 2020-136064

(51) Int. Cl.
*G08G 1/14* (2006.01)
*G01C 21/34* (2006.01)
*G06V 20/59* (2022.01)

(52) U.S. Cl.
CPC ......... *G08G 1/143* (2013.01); *G01C 21/3484* (2013.01); *G06V 20/593* (2022.01)

(58) Field of Classification Search
CPC ... G08G 1/143; G06V 20/593; G01C 21/3484
See application file for complete search history.

(56) References Cited

FOREIGN PATENT DOCUMENTS

| JP | 2004-252661 A | 9/2004 |
|---|---|---|
| JP | 2004286519 A | 10/2004 |
| JP | 2015-021863 A | 2/2015 |
| JP | 2016-075499 A | 5/2016 |
| JP | 2017-124802 A | 7/2017 |
| JP | 2019-121211 A | 7/2019 |
| JP | 2019152992 A | 9/2019 |
| JP | 2019158354 A | 9/2019 |
| WO | 2016/051729 A1 | 4/2016 |

*Primary Examiner* — Mathew Franklin Gordon
(74) *Attorney, Agent, or Firm* — Dinsmore & Shohl LLP (57) ABSTRACT

An information processing apparatus includes a controller configured to acquire occupant information regarding an occupant in a vehicle trying to park in a parking lot, and identify a parking position appropriate for the vehicle in the parking lot based on the occupant information.

20 Claims, 6 Drawing Sheets

INFORMATION PROCESSING APPARATUS, INFORMATION PROCESSING SYSTEM, NON-TRANSITORY COMPUTER READABLE MEDIUM, AND INFORMATION PROCESSING METHOD

CROSS-REFERENCE TO RELATED APPLICATION

This application claims priority to Japanese Patent Application No. 2020-136064, filed on Aug. 11, 2020, the entire contents of which are incorporated herein by reference.

TECHNICAL FIELD

The present disclosure relates to an information processing apparatus, an information processing system, a program, and an information processing method.

BACKGROUND

Technology to assist with parking of a vehicle in a parking lot is known.

For example, the technology disclosed in patent literature (PTL) 1 collects the type of the facility to which the parking lot belongs and an action performed on the vehicle by an occupant after parking as the action history of the occupant. When the vehicle is to park anew in a parking lot, and the type of the facility to which the parking lot belongs is acquired, the action characteristics of the occupant corresponding to the acquired type of the facility are then identified based on the collected action history of the occupant. Assistance is then provided for parking in a parking space, among the parking spaces in the parking lot, corresponding to the identified action characteristics of the occupant.

CITATION LIST

Patent Literature

PTL 1: JP 2019-158354 A

SUMMARY

The technology disclosed in PTL 1 has trouble assisting with parking of a vehicle in a parking lot if an action history has not been collected for the occupant of the vehicle.

There is room for improvement in assisting with parking of a vehicle in a parking lot.

It would be helpful to improve technology for assisting with parking of a vehicle in a parking lot.

An information processing apparatus according to the present disclosure includes a controller configured to:
acquire occupant information regarding an occupant in a vehicle trying to park in a parking lot; and
identify a parking position appropriate for the vehicle in the parking lot based on the occupant information.

A program according to the present disclosure is configured to cause a computer to perform operations including:
acquiring occupant information regarding an occupant in a vehicle trying to park in a parking lot; and
identifying a parking position appropriate for the vehicle in the parking lot based on the occupant information.

An information processing method according to the present disclosure is an information processing method for an information processing apparatus, the information processing method including:
acquiring occupant information regarding an occupant in a vehicle trying to park in a parking lot; and
identifying a parking position appropriate for the vehicle in the parking lot based on the occupant information.

According to the present disclosure, technology for assisting with parking of a vehicle in a parking lot can be improved.

DETAILED DESCRIPTION

Embodiments of the present disclosure are described below with reference to the drawings.

Figure 1:
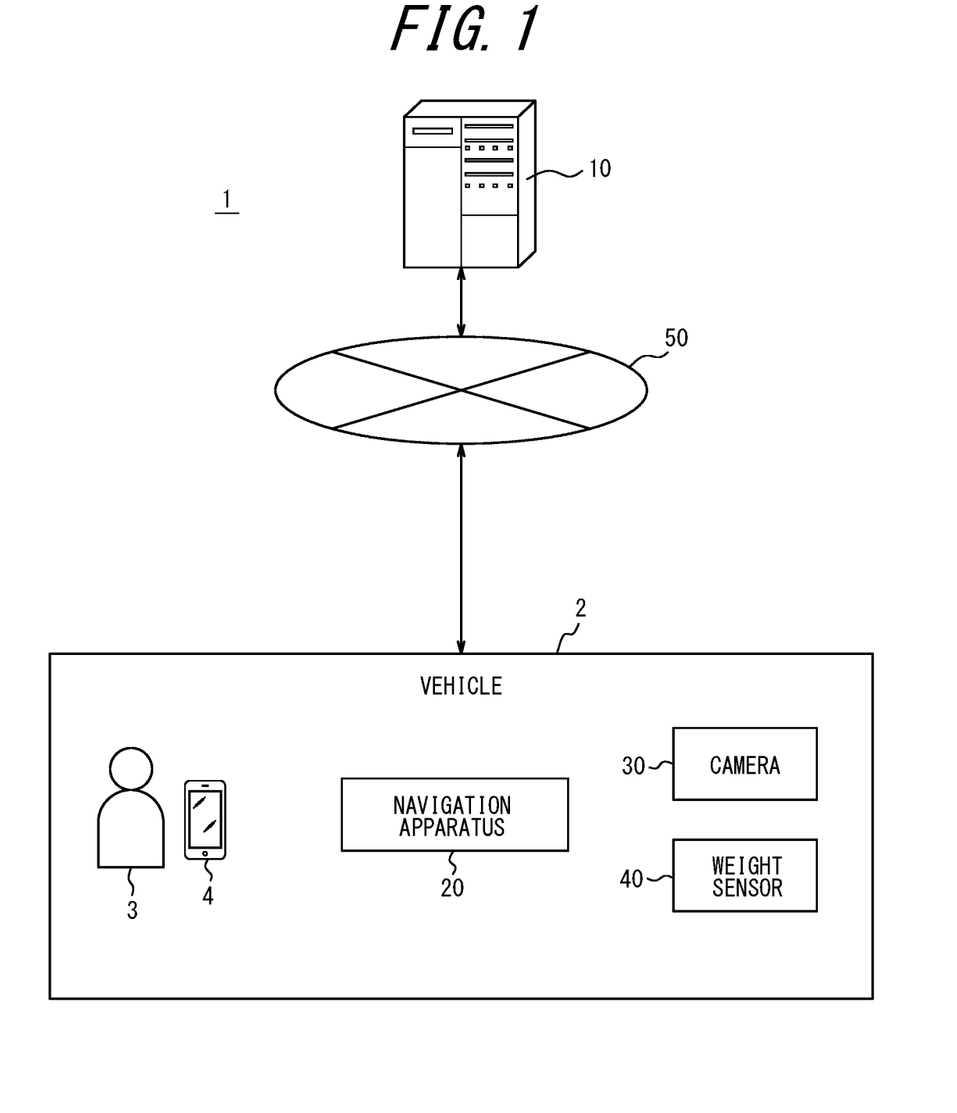
FIG. 1 is a diagram illustrating a configuration of an information processing system according to an embodiment of the present disclosure.

FIG. 1 is a diagram illustrating a configuration of an information processing system 1 according to an embodiment of the present disclosure. With reference to FIG. 1, a configuration and outline of the information processing system 1 according to an embodiment of the present disclosure are described.

The information processing system 1 includes an information processing apparatus 10 and a navigation apparatus 20 that is mounted on a vehicle 2. The information processing system 1 may further include a camera 30 and a weight sensor 40 that are mounted on the vehicle 2.

The information processing apparatus 10 and the navigation apparatus 20 are communicably connected via a network 50. The network 50 may be a network including a mobile communication network, the Internet, or the like. The camera 30 and the weight sensor 40 are communicably connected to the navigation apparatus 20 in a wired or wireless manner. The camera 30 and the weight sensor 40 may be communicably connected to the information processing apparatus 10 via the network 50.

An occupant 3 is on board the vehicle 2. In the example illustrated in FIG. 1, the occupant 3 is in possession of a terminal apparatus 4. The terminal apparatus 4 may, for example, be a smartphone or tablet.

In FIG. 1, one each of the information processing apparatus 10 and the vehicle 2 are illustrated, but the number of information processing apparatuses 10 and vehicles 2 may be two or more of each. In FIG. 1, one each of the navigation apparatus 20, the camera 30, and the weight sensor 40 are mounted in the vehicle 2, but the number of navigation apparatuses 20, cameras 30, and weight sensors 40 mounted in the vehicle 2 may be two or more of each. In FIG. 1, one occupant 3 is on board the vehicle 2, but the number of occupants 3 on board the vehicle 2 may be two or more.

The information processing apparatus 10 is, for example, a dedicated computer configured to function as a server. The information processing apparatus 10 may be a general purpose personal computer (PC).

The information processing apparatus 10 is communicably connected via the network 50 to the navigation apparatus 20 mounted in the vehicle 2. The information processing apparatus 10 acquires information on the current position of the vehicle 2, occupant information regarding the occupant 3 on board the vehicle 2, and the like from the navigation apparatus 20 mounted on the vehicle 2 when the vehicle 2 enters a parking lot and tries to park in the parking lot. The information processing apparatus 10 identifies a parking position appropriate for the vehicle 2, in the parking lot where the vehicle 2 is trying to park, based on the occupant information acquired from the navigation apparatus 20. The information processing apparatus 10 transmits information on the identified parking position to the navigation apparatus 20. Specific examples of the "occupant information" are described later.

The vehicle 2 is any appropriate type of automobile, such as a gasoline-powered vehicle, a diesel-powered vehicle, a hybrid vehicle (HV), a plug-in hybrid vehicle (PHV), an electric vehicle (EV), or a fuel cell vehicle (FCV). Driving of the vehicle 2 may be automated at any level. The level of automation is, for example, one of level 1 to level 5 in the level classification of the Society of Automotive Engineers (SAE). The vehicle 2 may be a Mobility as a Service (MaaS) dedicated vehicle.

The navigation apparatus 20 is mounted on the vehicle 2. The navigation apparatus 20 may be a car navigation device for in-vehicle use only or may be an electronic device, such as a smartphone or tablet, capable of executing a navigation application. When a navigation application is executed on an electronic device such as a smartphone or a tablet, the electronic device need not be mounted on the vehicle 2.

The camera 30 is mounted on the vehicle 2. The camera 30 may be a dedicated camera or a camera built into another device, such as a drive recorder. The camera 30 can capture images of the inside of the vehicle 2. The camera 30 captures images of the occupant 3 on board the vehicle 2, luggage mounted on the vehicle 2, and the like. The camera 30 transmits the captured images to the navigation apparatus 20. The images captured by the camera 30 may be moving images or still images. The camera 30 may transmit the captured images to the information processing apparatus 10 via the network 50.

The weight sensor 40 is installed in each seat of the vehicle 2. The weight sensor 40 detects the weight of the occupant 3 sitting in each seat of the vehicle 2. The weight sensor 40 transmits information on the weight of the occupant 3 in each seat to the navigation apparatus 20. The weight sensor 40 may transmit information on the weight of the occupant 3 in each seat to the information processing apparatus 10 via the network 50.

Figure 2:
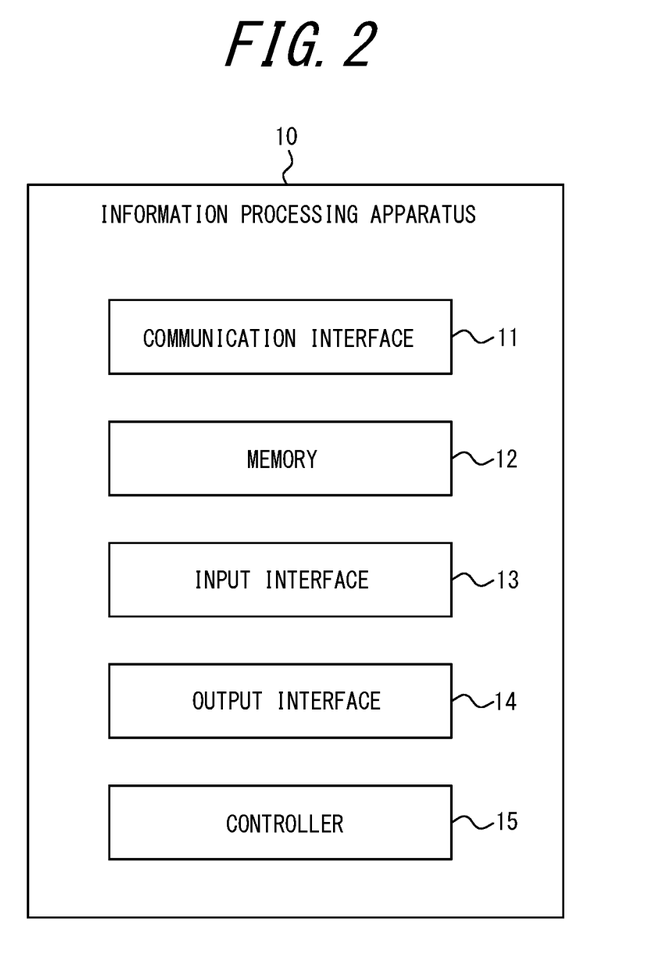
FIG. 2 is a block diagram illustrating a configuration of an information processing apparatus according to an embodiment of the present disclosure.

With reference to FIG. 2, the configuration of the information processing apparatus 10 according to an embodiment of the present disclosure is described.

The information processing apparatus 10 includes a communication interface 11, a memory 12, an input interface 13, an output interface 14, and a controller 15.

The communication interface 11 includes a communication module that connects to the network 50. For example, the communication interface 11 may include a communication module compliant with a local area network (LAN). In an embodiment, the information processing apparatus 10 is connected to the network 50 via the communication interface 11. The communication interface 11 transmits and receives various information via the network 50. The communication interface 11 can communicate with the navigation apparatus 20 via the network 50.

The memory 12 is, for example, a semiconductor memory, a magnetic memory, an optical memory, or the like, but is not limited to these. The memory 12 may, for example, function as a main memory, an auxiliary memory, or a cache memory. The memory 12 stores any information used for operations of the information processing apparatus 10. For example, the memory 12 may store a system program, an application program, various types of information received by the communication interface 11, and the like. The information stored in the memory 12 may, for example, be updated with information received from the network 50 via the communication interface 11. A portion of the memory 12 may be installed externally to the information processing apparatus 10. In this case, the externally installed portion of the memory 12 may be connected to the information processing apparatus 10 via any appropriate interface.

The input interface 13 includes one or more interfaces for input to detect user input and acquire input information based on user operations. For example, the input interface 13 includes, but is not limited to, a physical key, a capacitive key, a touch screen integrally provided with a display of the output interface 14, or a microphone that accepts audio input.

The output interface 14 includes one or more interfaces for output to output information and notify the user. For example, the output interface 14 includes, but is not limited to, a display for outputting information as images or a speaker for outputting information as audio.

The controller 15 includes at least one processor, at least one dedicated circuit, or a combination thereof. The processor is a general purpose processor, such as a central processing unit (CPU) or a graphics processing unit (GPU), or a dedicated processor specialized for a particular process. The dedicated circuit is, for example, a field-programmable gate array (FPGA) or an application specific integrated circuit (ASIC). The controller 15 executes processing related to operations of the information processing apparatus 10 while controlling each component of the information processing apparatus 10.

Figure 3:
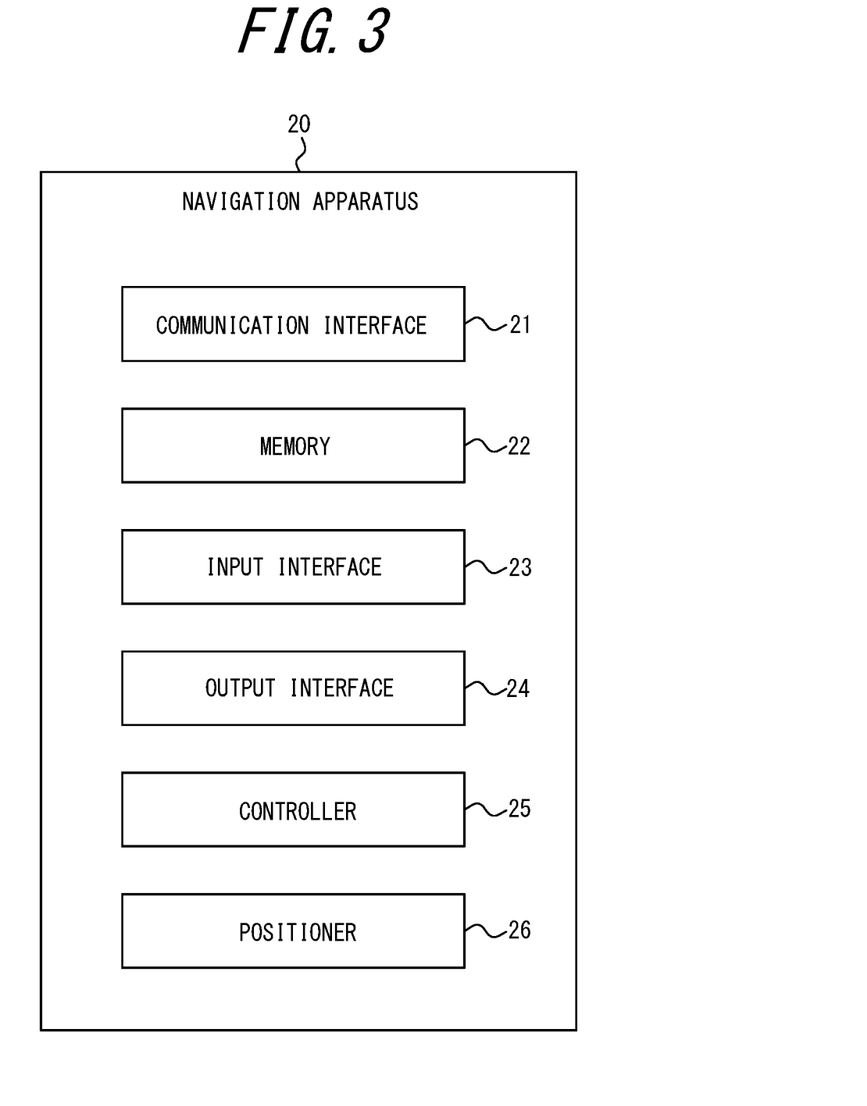
FIG. 3 is a block diagram illustrating a configuration of a navigation apparatus according to an embodiment of the present disclosure.

A configuration of the navigation apparatus 20 according to an embodiment of the present disclosure is described with reference to FIG. 3.

The navigation apparatus 20 includes a communication interface 21, a memory 22, an input interface 23, an output interface 24, a controller 25, and a positioner 26.

The communication interface 21 includes a communication module that connects to the network 50. For example, the communication interface 21 may include a communication module compliant with mobile communication standards such as Long Term Evolution (LTE), 4th Generation (4G), and 5th Generation (5G). In an embodiment, the navigation apparatus 20 is connected to the network 50 via the communication interface 21. The communication interface 21 transmits and receives various information via the network 50. The communication interface 21 can communicate with the information processing apparatus 10 via the network 50.

The communication interface 21 also includes a communication module that connects to the terminal apparatus 4, the camera 30, and the weight sensor 40. The communication interface 21 may, for example, include a communication module compliant with a short-range wireless communication standard such as Wi-Fi® (Wi-Fi is a registered trademark in Japan, other countries, or both), Bluetooth® (Bluetooth is a registered trademark in Japan, other countries, or both), or infrared communication. The communication interface 21 may, for example, include a communication module compliant with a communication standard for an in-vehicle network such as a controller area network (CAN).

The memory 22 is, for example, a semiconductor memory, a magnetic memory, an optical memory, or the like, but is not limited to these. The memory 22 may, for example, function as a main memory, an auxiliary memory, or a cache memory. The memory 22 stores any information used for operations of the navigation apparatus 20. For example, the memory 22 may store a system program, an application program, various types of information received by the communication interface 21, and the like. The information stored in the memory 22 may, for example, be updated with information received from the network 50 via the communication interface 21.

The input interface 23 includes one or more interfaces for input to detect user input and acquire input information based on user operations. For example, the input interface 23 includes, but is not limited to, a physical key, a capacitive key, a touch screen integrally provided with a display of the output interface 24, or a microphone that accepts audio input.

The output interface 24 includes one or more interfaces for output to output information and notify the user. For example, the output interface 24 includes, but is not limited to, a display for outputting information as images or a speaker for outputting information as audio.

The controller 25 includes at least one processor, at least one dedicated circuit, or a combination thereof. The processor is a general purpose processor, such as a CPU or GPU, or a dedicated processor specialized for a particular process. The dedicated circuit is, for example, an FPGA or an ASIC. The controller 25 executes processing related to operations of the navigation apparatus 20 while controlling each component of the navigation apparatus 20.

The positioner 26 includes one or more receivers compliant with any appropriate satellite positioning system. For example, the positioner 26 may include a Global Positioning System (GPS) receiver. The positioner 26 acquires the measured position of the navigation apparatus 20 as positional information. The positional information includes, for example, an address, latitude, longitude, altitude, and the like. Since the navigation apparatus 20 is mounted on the vehicle 2, the positional information acquired by the positioner 26 is also the positional information for the vehicle 2.

(Operations of Information Processing System)

Operations of the information processing system 1 illustrated in FIG. 1 are described with reference to FIGS. 1 to 3 and the like.

The controller 25 of the navigation apparatus 20 transmits information on the position of the vehicle 2, acquired by the positioner 26, to the information processing apparatus 10 via the communication interface 21. The controller 25 may transmit the information on the position of the vehicle 2 to the information processing apparatus 10 via the communication interface 21 continuously or periodically. Alternatively, the controller 25 may transmit the information on the position of the vehicle 2 to the information processing apparatus 10 via the communication interface 21 when determining that the vehicle 2 is located in a parking lot based on the position of the vehicle 2 acquired from the positioner 26.

The controller 25 transmits occupant information regarding the occupant 3 in the vehicle 2 to the information processing apparatus 10 via the communication interface 21. The occupant information regarding the occupant 3 in the vehicle 2 is also referred to below simply as "occupant information".

The occupant information is various information regarding the occupant 3 on board the vehicle 2. The occupant information is, for example, schedule information for the occupant 3, an image in which the occupant 3 is captured, and/or information on the weight of the occupant 3. The occupant information is not limited to this information, however, and may be other information regarding the occupant 3 in the vehicle 2.

The controller 25 may transmit the occupant information to the information processing apparatus 10 via the communication interface 21 continuously or periodically. Alternatively, the controller 25 may transmit the occupant information to the information processing apparatus 10 via the communication interface 21 when it is determined that the vehicle 2 is located in a parking lot.

The controller 25 acquires the schedule information for the occupant 3 in the vehicle 2 from the terminal apparatus 4 of the occupant 3 via the communication interface 21. The controller 25 transmits the schedule information for the occupant 3 to the information processing apparatus 10 via the communication interface 21 as the occupant information. The controller 25 may transmit the schedule information for the occupant 3 to the information processing apparatus 10 via the communication interface 21 continuously or periodically. Alternatively, the controller 25 may transmit the schedule information for the occupant 3 to the information processing apparatus 10 via the communication interface 21 when it is determined that the vehicle 2 is located in a parking lot.

The camera 30 captures images of the inside of the vehicle 2 and transmits the captured images to the navigation apparatus 20. The images of the inside of the vehicle 2 include images of the occupant 3 on board the vehicle 2, images of the baggage on board the vehicle 2, and the like.

The controller 25 of the navigation apparatus 20 acquires the images of the inside of the vehicle 2 captured by the camera 30 from the camera 30 via the communication interface 21. The controller 25 transmits the images of the inside of the vehicle 2 to the information processing apparatus 10 via the communication interface 21 as occupant information. The controller 25 may transmit the images of the inside of the vehicle 2 to the information processing apparatus 10 via the communication interface 21 continuously or periodically. Alternatively, the controller 25 may transmit the images of the inside of the vehicle 2 to the information processing apparatus 10 via the communication interface 21 when it is determined that the vehicle 2 is located in a parking lot.

The weight sensor 40 detects the weight of the occupant 3 sitting in each seat of the vehicle 2 and transmits the weight information for the occupant 3 in each seat to the navigation apparatus 20.

The controller 25 of the navigation apparatus 20 acquires the information on the weight of the occupant 3 in each seat of the vehicle 2 detected by the weight sensor 40 from the weight sensor 40 via the communication interface 21. The controller 25 transmits the information on the weight of the occupant 3 in each seat of the vehicle 2 to the information processing apparatus 10 via the communication interface 21 as occupant information. The controller 25 may transmit the information on the weight of the occupant 3 in each seat of the vehicle 2 to the information processing apparatus 10 via the communication interface 21 continuously or periodically. Alternatively, the controller 25 may transmit the information on the weight of the occupant 3 in each seat of the vehicle 2 to the information processing apparatus 10 via the communication interface 21 when it is determined that the vehicle 2 is located in a parking lot.

The controller 15 of the information processing apparatus 10 acquires the information on the position of the vehicle 2 and the occupant information from the navigation apparatus 20 via the communication interface 11.

The memory 12 of the information processing apparatus 10 stores information regarding the parking lot. For example, as information regarding the parking lot, the memory 12 stores the location of the parking lot, the arrangement of parking spaces in the parking lot, the structure of the parking lot, the fee, vacancy information, and the like.

By receiving input of information regarding the parking lot to the input interface 13, or by acquiring information regarding the parking lot via the communication interface 11 from an apparatus connected to the network 50, the information processing apparatus 10 can store the information regarding the parking lot in the memory 12 or update information regarding the parking lot already stored in the memory 12.

The information regarding the parking lot is not necessarily stored by the memory 12. For example, the information regarding the parking lot may be stored by an external server that manages the information regarding the parking lot. In the present embodiment, the information regarding the parking lot is described as being stored by the memory 12.

When the controller 15 determines that the vehicle 2 is trying to park in the parking lot based on the information on the position of the vehicle 2 acquired from the navigation apparatus 20, the controller 15 identifies a parking position appropriate for the vehicle 2 in the parking lot based on the occupant information acquired from the navigation apparatus 20. In identifying the parking position, the controller 15 refers to the information, stored by the memory 12, regarding the parking lot. The controller 15 may identify one parking position that is most appropriate as the parking position in the parking lot or may identify a plurality of parking positions that meet a condition.

For example, the controller 15 identifies the parking position appropriate for the vehicle 2 in the parking lot based on the schedule information for the occupant 3 acquired as the occupant information. For example, when the controller 15 acquires information that the occupant 3 is scheduled to play baseball as the schedule information for the occupant 3, and the vehicle 2 is in the parking lot of a baseball field, the controller 15 identifies a parking position with a wide parking space as the parking position appropriate for the vehicle 2. This enables the occupant 3 to smoothly load and unload large items, such as baseball equipment. Alternatively, when the controller 15 acquires information that the occupant 3 is scheduled to watch a baseball game as the schedule information for the occupant 3, for example, and the vehicle 2 is in the parking lot of a baseball field, the controller 15 identifies a parking position near the entrance to the baseball field as the parking position appropriate for the vehicle 2. This enables the occupant 3 to enter the baseball field without walking a long distance.

The controller 15 determines whether a child is on board the vehicle 2, for example, based on the acquired occupant information. The controller 15 may, for example, determine whether a child is on board the vehicle 2 based on an image of the inside of the vehicle 2 acquired as the occupant information. The controller 15 may, for example, determine whether a child on board the vehicle 2 by analyzing the faces of people included in the image of the inside of the vehicle 2. Alternatively, the controller 15 may, for example, determine whether a child is on board the vehicle 2 based on information on the weight of the occupant 3 in each seat of the vehicle 2 acquired as the occupant information. The controller 15 may, for example, determine that a child is on board the vehicle 2 when determining that an occupant 3 with a weight within a predetermined range is seated in any of the seats of the vehicle 2.

When it is determined that a child is on board the vehicle 2, the controller 15 identifies a parking position with a wide parking space as the parking position appropriate for the vehicle 2. The door of the vehicle 2 can therefore be opened wider when the door is opened, enabling the child on board the vehicle 2 to get on and off the vehicle 2 smoothly.

The controller 15 transmits information on the parking position identified based on the occupant information to the navigation apparatus 20 via the communication interface 11.

The controller 25 of the navigation apparatus 20 acquires the information on the parking position identified based on the occupant information from the information processing apparatus 10 via the communication interface 21.

Figure 4:
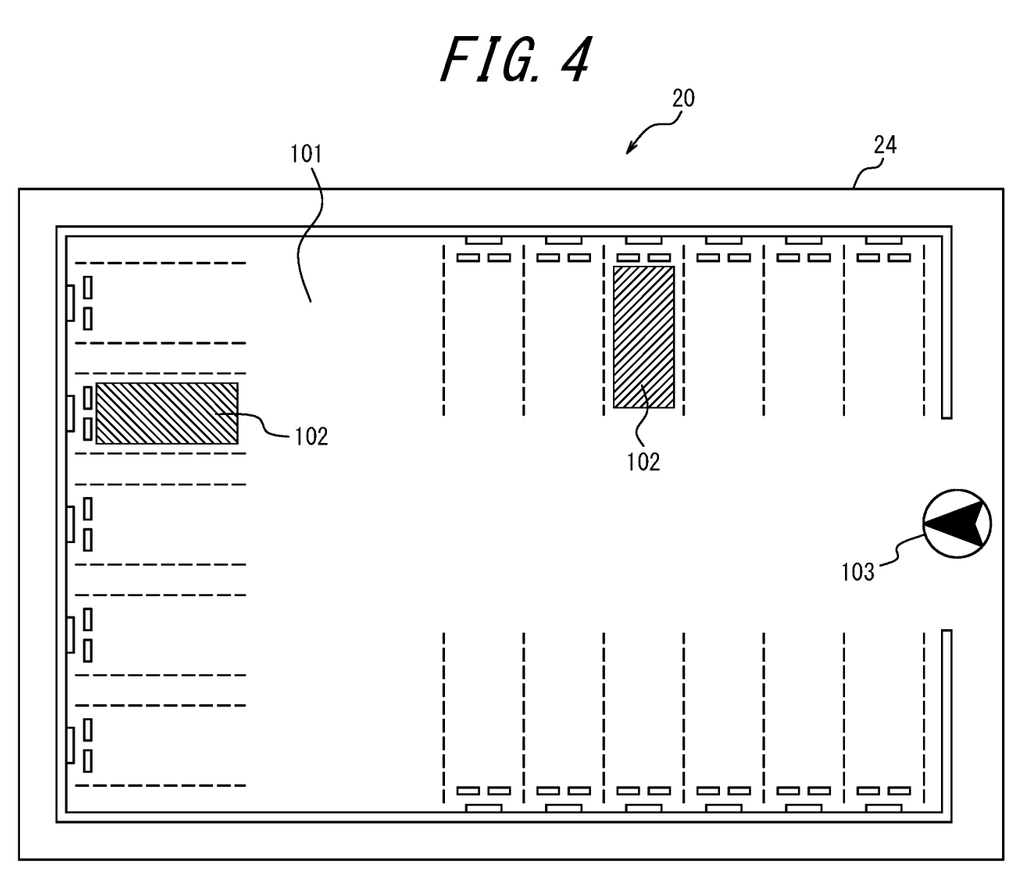
FIG. 4 is a diagram illustrating an example in which information on an identified parking position is displayed.

The controller 25 may display the information on the parking position acquired from the information processing apparatus 10 on the output interface 24. FIG. 4 illustrates an example in which the controller 25 displays the information on the parking position on the output interface 24 of the navigation apparatus 20.

In the example illustrated in FIG. 4, the controller 25 displays a parking lot 101, an identified parking position 102, and a position 103 of the vehicle 2 on the output interface 24. In the example illustrated in FIG. 4, there are two identified parking positions 102.

By a top view of the parking lot 101 where the vehicle 2 is trying to park and the parking position 102 appropriate for the occupant information being displayed on the output interface 24 in this way, the driver of the vehicle 2 can easily find the parking position 102, in the parking lot 101, that is appropriate for the current occupant information.

(Provision of Parking Fee Information)

When transmitting the information on the identified parking position to the navigation apparatus 20, the controller 15 of the information processing apparatus 10 may also transmit information on a parking fee to the navigation apparatus 20 via the communication interface 11. The information on the parking fee is information on the parking fee for the identified parking position. The information on the parking fee may be stored by the memory 12.

The controller 25 of the navigation apparatus 20 may display, on the output interface 24, the information on the parking fee acquired from the information processing apparatus 10 together with the information on the parking position.

(Case of Not Providing Information on Parking Position)

The controller 15 of the information processing apparatus 10 may be configured not to identify a parking position when a predetermined condition is satisfied and instead to transmit information indicating that there is no appropriate parking position to the navigation apparatus 20 via the communication interface 11.

The predetermined condition may, for example, be that the parking lot is full or that the parking fee exceeds a maximum parking fee set in advance by the occupant 3. Here, the maximum parking fee is a maximum allowable parking fee set by being inputted in advance to the terminal apparatus 4 by the occupant 3. The maximum parking fee may be stored by the memory 12 of the information processing apparatus 10.

When the predetermined condition is satisfied, the controller 15 may transmit information indicating that the parking lot is full, that the maximum parking fee is exceeded, or the like to the navigation apparatus 20 via the communication interface 11.

Upon receiving, from the information processing apparatus 10, information indicating that the parking lot is full, that the maximum parking fee is exceeded, or the like, the controller 25 of the navigation apparatus 20 may display the information on the output interface 24.

Figure 5:
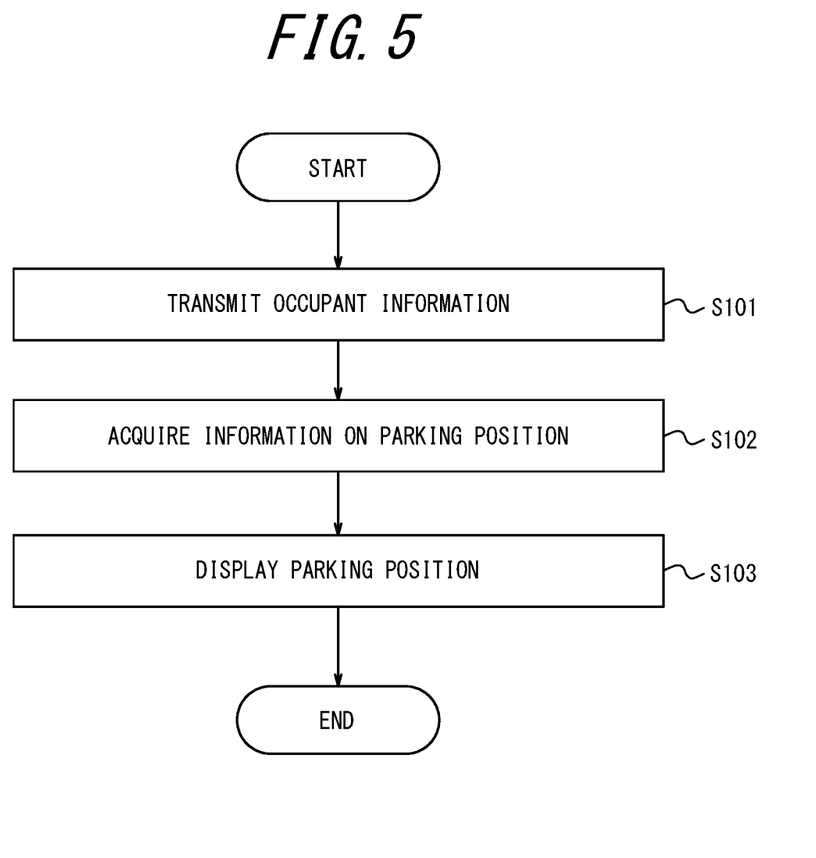
FIG. 5 is a flowchart illustrating operations of an information processing system according to an embodiment of the present disclosure.
Figure 6:
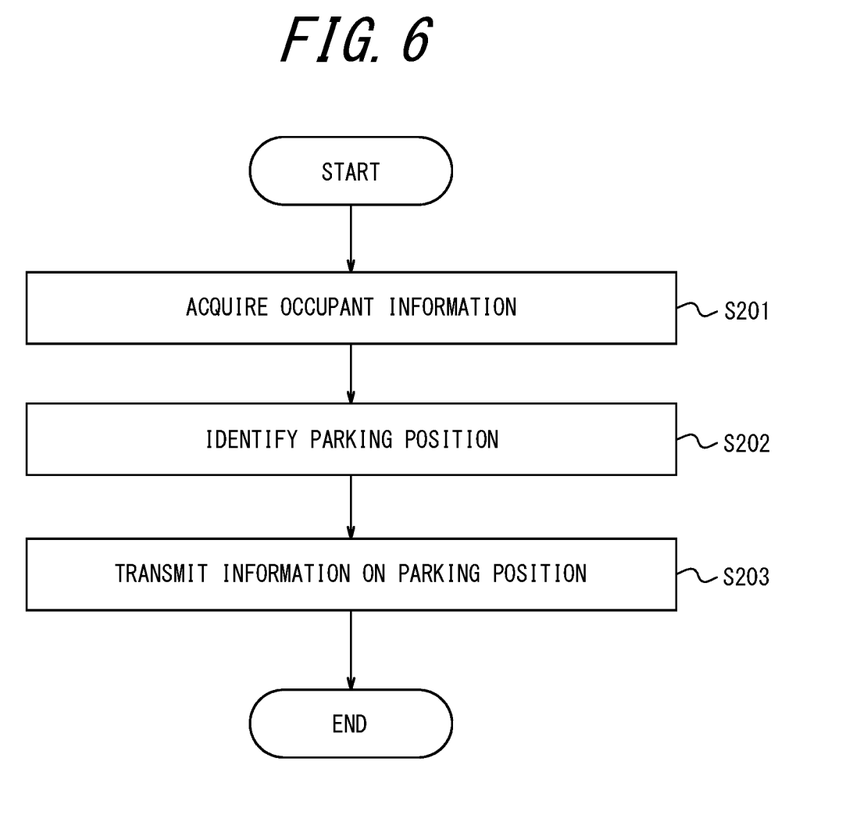
FIG. 6 is a flowchart illustrating operations of an information processing system according to an embodiment of the present disclosure.

Operations of the information processing system 1 are described with reference to the flowcharts in FIGS. 5 and 6. FIG. 5 is a flowchart mainly illustrating operations of the navigation apparatus 20. FIG. 6 is a flowchart mainly illustrating operations of the information processing apparatus 10.

In step S101 of FIG. 5, the controller 25 of the navigation apparatus 20 transmits the occupant information regarding the occupant 3 in the vehicle 2 to the information processing apparatus 10 via the communication interface 21. The controller 25 also transmits the information on the position of the vehicle 2 to the information processing apparatus 10 via the communication interface 21.

In step S201 of FIG. 6, the controller 15 of the information processing apparatus 10 acquires the occupant information for the vehicle 2 from the navigation apparatus 20 via the communication interface 11. The controller 15 of the information processing apparatus 10 also acquires the information on the position of the vehicle 2 and occupant information from the navigation apparatus 20 via the communication interface 11.

In step S202 of FIG. 6, when the controller 15 determines that the vehicle 2 is trying to park in the parking lot based on the information on the position of the vehicle 2 acquired from the navigation apparatus 20, the controller 15 identifies a parking position appropriate for the vehicle 2 in the parking lot based on the occupant information acquired from the navigation apparatus 20.

In step S203 of FIG. 6, the controller 15 transmits information on the parking position identified based on the occupant information to the navigation apparatus 20 via the communication interface 11.

In step S102 of FIG. 5, the controller 25 of the navigation apparatus 20 acquires the information on the parking position identified based on the occupant information from the information processing apparatus 10 via the communication interface 21.

In step S103 of FIG. 5, the controller 25 displays the information on the parking position acquired from the information processing apparatus 10 on the output interface 24.

As described above, in the information processing apparatus 10 according to the present embodiment, the controller 15 acquires the occupant information regarding the occupant 3 in the vehicle 2 that is trying to park in the parking lot. The controller 15 identifies the parking position appropriate for the vehicle 2 in the parking lot based on the acquired occupant information. The information processing apparatus 10 according to the present embodiment can thus identify a parking position appropriate for the vehicle 2, in the parking lot where the vehicle 2 is trying to park, based on the occupant information acquired for the occupant 3 on board the vehicle 2. Therefore, the information processing apparatus 10 according to the present disclosure can improve technology for assisting with parking of a vehicle in a parking lot.

The present disclosure is not limited to the above-described embodiments. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

For example, some processing operations performed in the information processing apparatus 10 in the above-described embodiment may be performed in the navigation apparatus 20. At least a portion of the processing operations performed in the navigation apparatus 20 may be performed in the information processing apparatus 10.

For example, a general purpose electronic device, such as a computer, can also be configured to function as the information processing apparatus 10 according to the above-described embodiment. Specifically, a program describing the processing content for realizing the functions of the information processing apparatus 10 and the like according to the embodiment can be stored in a memory of the electronic device, and the program can be read and executed by the processor of the electronic device.

Accordingly, the present disclosure can also be embodied as a program executable by a processor.

For example, in the above-described embodiment, the navigation apparatus 20 transmits various information to the information processing apparatus 10 via the communication interface 21, but if the vehicle 2 is provided with a separate communication apparatus from the navigation apparatus 20, the navigation apparatus 20 may transmit various information to the information processing apparatus 10 via the separate communication apparatus.

For example, in the above-described embodiment, the images captured by the camera 30 are transmitted to the information processing apparatus 10 via the communication interface 21 of the navigation apparatus 20, but if the vehicle 2 is provided with a separate communication apparatus from the navigation apparatus 20, the images captured by the camera 30 may be transmitted to the information processing apparatus 10 via the separate communication apparatus.

For example, in the above-described embodiment, the information on the weight of the occupant 3 in each seat, detected by the weight sensor 40, is transmitted to the information processing apparatus 10 via the communication interface 21 of the navigation apparatus 20, but if the vehicle 2 is provided with a separate communication apparatus from the navigation apparatus 20, the information on the weight of the occupant 3 in each seat, detected by the weight sensor 40, may be transmitted to the information processing apparatus 10 via the separate communication apparatus.

The invention claimed is:

1. An information processing apparatus comprising a controller configured to:
    acquire occupant information regarding an occupant in a vehicle trying to park in a parking lot; and
    identify a parking position appropriate for the vehicle in the parking lot based on the occupant information.

2. The information processing apparatus of claim 1, wherein the controller is further configured to:
    acquire the occupant information from a navigation apparatus mounted in the vehicle; and transmit information on the identified parking position to the navigation apparatus.

3. The information processing apparatus of claim 2, wherein the controller is further configured to acquire schedule information for the occupant as the occupant information.

4. The information processing apparatus of claim 3, wherein the controller is further configured to acquire the schedule information for the occupant via the navigation apparatus from a terminal apparatus of the occupant, the terminal apparatus being configured to communicate with the navigation apparatus.

5. The information processing apparatus of claim 1, wherein the controller is further configured to acquire an image capturing the occupant as the occupant information.

6. The information processing apparatus of claim 1, wherein the controller is further configured to acquire information on a weight of the occupant as the occupant information.

7. The information processing apparatus of claim 5, wherein the controller is further configured to:
determine whether a child is on board the vehicle based on the image capturing the occupant and/or information on a weight of the occupant; and
identify a wide parking position as the parking position appropriate for the vehicle when a child is determined to be on board.

8. An information processing system comprising:
the information processing apparatus of claim 1; and
a navigation apparatus mounted on the vehicle.

9. A non-transitory computer readable medium storing a program configured to cause a computer to perform operations comprising:
acquiring occupant information regarding an occupant in a vehicle trying to park in a parking lot; and
identifying a parking position appropriate for the vehicle in the parking lot based on the occupant information.

10. The non-transitory computer readable medium of claim 9, wherein
the acquiring the occupant information includes acquiring the occupant information from a navigation apparatus mounted in the vehicle, and
the program is configured to cause the computer to perform operations further comprising transmitting information on the identified parking position to the navigation apparatus.

11. The non-transitory computer readable medium of claim 10, wherein the acquiring the occupant information includes acquiring schedule information for the occupant as the occupant information.

12. The non-transitory computer readable medium of claim 11, wherein the acquiring the schedule information for the occupant includes acquiring the schedule information for the occupant via the navigation apparatus from a terminal apparatus of the occupant, the terminal apparatus being configured to communicate with the navigation apparatus.

13. The non-transitory computer readable medium of claim 9, wherein the acquiring the occupant information includes acquiring an image capturing the occupant as the occupant information.

14. The non-transitory computer readable medium of claim 9, wherein the acquiring the occupant information includes acquiring information on a weight of the occupant as the occupant information.

15. An information processing method for an information processing apparatus, the information processing method comprising:
acquiring occupant information regarding an occupant in a vehicle trying to park in a parking lot; and
identifying a parking position appropriate for the vehicle in the parking lot based on the occupant information.

16. The information processing method of claim 15, wherein
the acquiring the occupant information includes acquiring the occupant information from a navigation apparatus mounted in the vehicle, and
the information processing method further comprises transmitting information on the identified parking position to the navigation apparatus.

17. The information processing method of claim 16, wherein the acquiring the occupant information includes acquiring schedule information for the occupant as the occupant information.

18. The information processing method of claim 17, wherein the acquiring the schedule information for the occupant includes acquiring the schedule information for the occupant via the navigation apparatus from a terminal apparatus of the occupant, the terminal apparatus being configured to communicate with the navigation apparatus.

19. The information processing method of claim 15, wherein the acquiring the occupant information includes acquiring an image capturing the occupant as the occupant information.

20. The information processing method of claim 15, wherein the acquiring the occupant information includes acquiring information on a weight of the occupant as the occupant information.

* * * * *